UNITED STATES PATENT OFFICE.

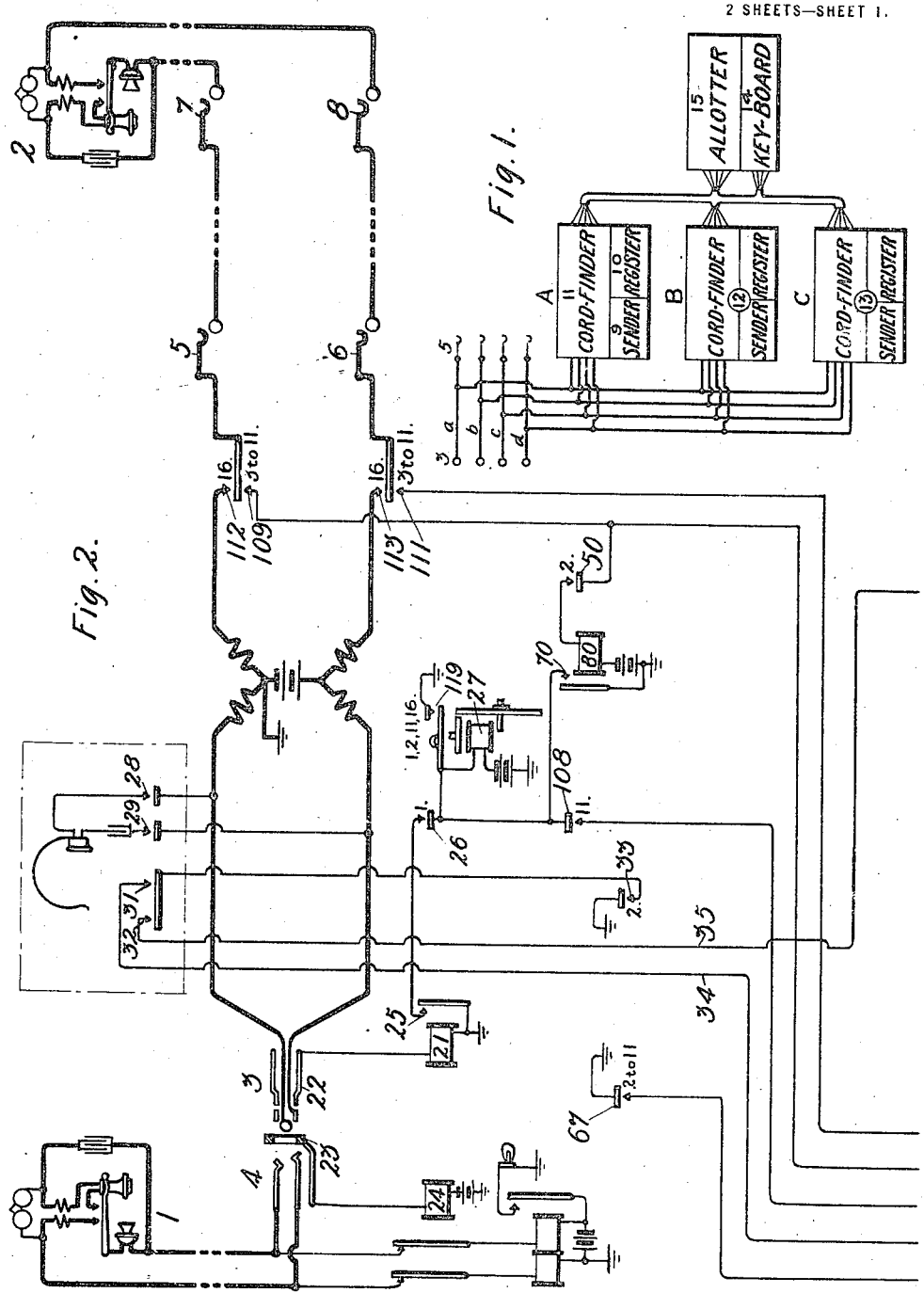

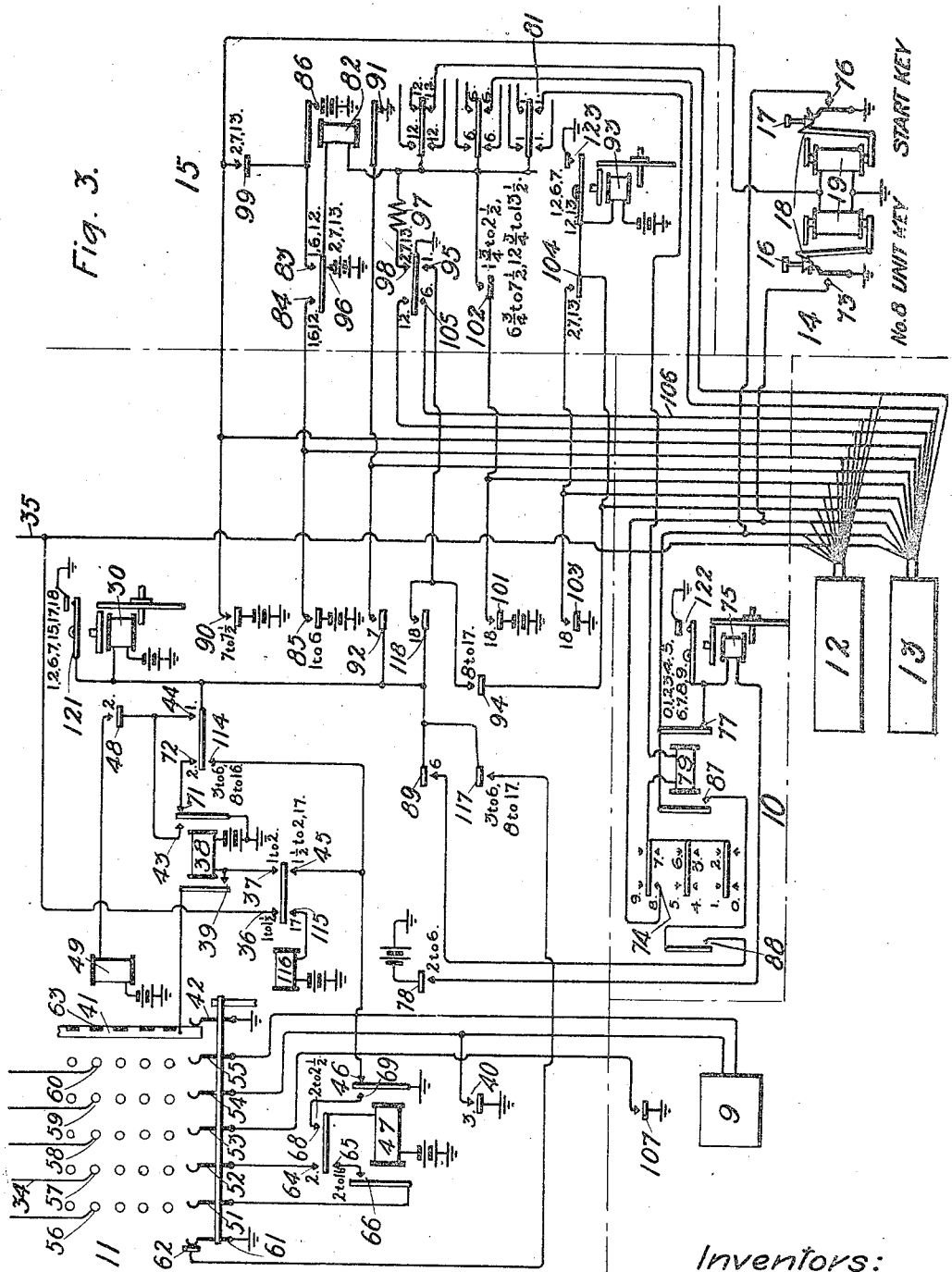

FRANK N. REEVES, OF NEWARK, NEW JERSEY, AND ALBEN E. LUNDELL, OF NEW YORK, N. Y., ASSIGNORS TO WESTERN ELECTRIC COMPANY, OF NEW YORK, N. Y., A CORPORATION OF ILLINOIS.

SWITCH-CONTROLLER SYSTEM.

1,165,447.  Specification of Letters Patent.  Patented Dec. 28, 1915.

Application filed December 12, 1914.   Serial No. 876,784.

*To all whom it may concern:*

Be it known that we, FRANK N. REEVES and ALBEN E. LUNDELL, citizens of the United States, residing at Newark, in the county of Essex and State of New Jersey, and at New York, in the county of Bronx and State of New York, respectively, have invented certain new and useful Improvements in Switch-Controller Systems, of which the following is a full, clear, concise, and exact description.

This invention relates to a system of controllers for automatic switches in telephone exchanges, and particularly to a semi-automatic system in which each operator's position is provided with an adjustable primary controller and a plurality of secondary controllers. Its object is to afford an effective indication to the operator of the unreadiness for use of any secondary controller associated with the primary controller.

It is usual in semi-automatic systems to provide each operator's position with a single primary controller in the form of a number keyboard, by means of which the operator may "write down" the number of the line wanted by a calling subscriber, and associated with this primary controller a plurality of secondary controllers allotted one at a time to the primary controller. Each such secondary controller may include a point finder or other register mechanism adapted to be adjusted automatically by means of the primary controller to register the number indication written down by the operator, thus leaving the primary controller available for the adjustment of the register mechanism of another secondary controller during the period of use of the former in controlling the operation of automatic switching apparatus. Locking means is usually provided for such a primary controller to retain its elements in their adjusted positions until the register elements of the associated secondary controller are correspondingly adjusted, whereupon the locking means is released or retracted to permit the restoration of the primary controller. The operator is thus notified of the completed registration of the number of the wanted line on the secondary controllers, and the availability of the primary controller for use with another secondary controller.

It occasionally occurs in such a system that all of the secondary controllers at an operator's position are in use at the same time, in which event it is desirable that the operator await the return of one of them to idle condition before again adjusting the primary controller in order that such adjustment may be effective in transferring the number registration to some secondary controller. This invention provides a very convenient and effective means to prevent the operator from adjusting the primary controller until there is a secondary controller available and an effective indication of the busy condition of all of them. The particular means for this purpose which is preferred and which is described in the following specification, is a keyboard lock-releasing or lock-retracting means which is maintained effective after the register elements of the last available secondary controller have been adjusted and until one, at least, of the secondary controllers becomes idle. During any such period, the operator on attempting to adjust the primary controller for another call, perceives at once by the immediate retraction, instead of the normal locking of its elements, that no secondary controller is available and she must necessarily wait until the locking means again becomes effective.

The invention will be understood more in detail by reference to the accompanying drawings, wherein is disclosed so much of a telephone exchange system as is necessary to a full explanation of the invention.

Figure 1 is a chart indicating the relation of the principal controlling units as applied in the system; Figs. 2 and 3 show in skeleton outline a telephone circuit extending between a calling subscriber's station 1 and a called subscriber's station 2, together with detail circuits for the controllers. The subscriber's circuit is adapted to be built up by the insertion of a plug 3 of one of the operator's connecting circuits into a spring-jack 4 of the calling line, and by the adjustment of automatic switches indicated by the contacts 5, 6 and 7, 8. The construction of these switches and the particular circuit arrangement for controlling their operation, not being essential to a full understanding of the invention, are not shown. It is understood that any form of switch and scheme of control therefor may be used. A sender is indicated at 9 (Fig. 3) and there is associated with it a register 10 and a cord or connecting circuit finder 11. The sender, register and cord finder together constitute a secondary switch controller. Two other such secondary switch controllers are indicated at 12 and 13. A keyboard is indicated at 14 and an allotter at 15, the latter being adapted, in a manner presently to be stated, to bring the secondary controllers one at a time into operative relation to the primary controller or keyboard 14. The allotter shown herein is in construction like an ordinary sequence switch. It has six possible resting positions, 1, 2, 6, 7, 12 and 13. In positions 1, 6 and 12 it allots the three secondary controllers respectively. The intermediate positions 2, 7 and 13 are provided as extraordinary resting positions for the purposes of this invention. Only one number key 16 is shown. This may be assumed to be key No. 8 of the series of ten "units" keys 0 to 9 required in the keyboard. It will also be understood that there would be ordinarily in an automatic system a like series of ten "tens" keys, a series of ten "hundreds" keys, etc. There is also illustrated in the keyboard section of Fig. 3 a start key 17. All such keys of the keyboard are provided with locking means such as the detent or latch 18 by which, when the keys are depressed, they will be retained in depressed positions. Releasing magnets 19 are provided for retracting the locking means so that the keys may be restored at the proper time for a subsequent operation.

In Fig. 1 is shown the general arrangement controlling apparatus for a plurality of connection circuits $a$, $b$, $c$ and $d$. The single keyboard 14 and single allotter 15 are adapted to be associated one at a time in cyclic order with the secondary controller sets A, B, C, each such set comprising the cord finder 11, the register 10 and the sender 9.

The general scheme of operation may be briefly outlined as follows: When the operator answers the call by inserting the plug 3 into the spring-jack 4, the cord finder, say 11, of an idle pre-allotted secondary controller equipment brings the sender 9 and register 10 into association with the connecting circuit of that plug. The operator, after receiving instructions from the calling subscriber as to the line wanted, writes down on the keyboard 14 the number of that line, and then depresses the start key 17. The depressed number keys, including, say, key 16 and start key 17, remain depressed until the registers, including the units register 10, have advanced to positions corresponding to the depressed number keys, and then all the depressed keys are automatically released. Provided now that another secondary controller equipment, say 12 or 13, is idle, the allotter 15 will advance to a position to allot, that is to say, to place into condition for operation such other secondary controller equipment under control by the same keyboard for the purposes of another call. In such event the key locking means is restored to normal condition. If, however, neither of the other secondary controller equipments is idle at the time, the allotter will remain in an intermediate position where it will await the return of some one of the secondary equipments to idle condition. In this intermediate position the retracting magnets 19 for the locking means 18 of the keys are held energized so that the operator on making an attempt to write down the number of a subsequent call, will be notified by the immediate return of the keys that no secondary equipment is ready for operation. As soon, however, as any secondary controller becomes idle, the allotter will advance from its intermediate position to the next allotting position and place such secondary controller into operative condition and restore the keyboard locking means. The operator may then proceed to adjust the keys which will remain depressed as under normal condition of operation.

In the following which is a more detailed description of operation of the system, the circuits will ordinarily be traced from ground to battery (or battery to ground) using the abbreviations Gd and By as reference characters for ground and battery, respectively, and it is to be understood that these characters refer to the usual conventional symbols for ground and battery indicated in the drawings. When the operator answers a call by inserting the plug 3 of any of her connecting circuits in the spring-jack 4 of a calling line, a cord relay 21 is energized in a circuit, Gd, 21, 22, 23, 24, By, and closes a circuit Gd, 25, 26, 27, By, which includes a contact 26 and the motor magnet of the sequence switch 27. This sequence switch, which is associated with the apparatus of the operator's connecting circuit now taken for use, thereupon advances from its normal position 1 to position 2. The operator's listening-in switch having also been operated (automatically or otherwise), contacts 28, 29, 31 and 32 are closed, 28 and 29 bridging the operator's telephone set on the connecting circuit, and 31 and 32, together with contact 33 of the sequence switch 27, providing ground connections to conductors 34 and 35 leading to the controller equipment (Fig. 3). Conductor 35 has branch connections, one to each of the secondary controllers. In the event, now assumed, that the sender 9 and the equipment associated therewith, including the cord finder 11 and register 10, are allotted for service, the cord finder sequence switch 30 is resting in its normal position 1 so that there is closed at this time a circuit Gd, 33, 32, 35, 36, 37, 38, By. This circuit includes a test relay 38 which acts to close a locking circuit for itself by way of its contact 39 and an interrupter device of the cord finder, comprising the bar 41 and brush 42, and also closes a circuit Gd, 43, 44, 30, By, which sends the sequence switch 30 out of its normal position 1 into the cord finder hunting position 2. In its movement there is provided, as soon as position 1½ is reached, a further path for the test relay 38 by way of sequence switch contacts 37 and 45, and back contact 46 of a holding relay 47. There is also closed by the test relay 38, when the sequence switch reaches position 2, a circuit Gd, 43, 48, 49, By, which includes the lifting clutch magnet 49 for the cord finder. The moving member of this cord finder comprises seven brushes, five of which, 51, 52, 53, 54 and 55 are each adapted to sweep over a series of contacts. Each horizontal row of the contact bank, as shown in the diagram, constitutes the terminals associated with one of the cord or connecting circuits of that operator's position. Contacts 56, 57, 58, 59 and 60 are thus associated with the connecting circuit, shown in Fig. 2 of the drawing. The moving member of the cord finder also includes the brush 42 which sweeps over the surface of the interrupter bar 41 and a brush 61, which, when the cord finder is in normal position, makes contact with a terminal 62.

As the cord finder moves upwardly under the influence of the power magnet 49, the test relay locking circuit By, 38, 39, 41, 42, Gd, is intermittently broken, an interruption occurring at the moment the brushes are closely approaching mid-position on the fixed contacts. At this moment the brush 42 is moving on to an insulating section 63 of the interrupter bar 41. When the cord finder brushes reach the terminals of the connecting circuit taken for use, the holding relay 47 will be energized by reason of the ground connection to terminal 57, the circuit being as follows: By, 47, 64, 52, 57, 34, 31, 33, Gd. When energized it closes a locking circuit for itself as follows: By, 47, 65, 66, 51, 56, 67, Gd, and a second locking circuit for itself as follows: By, 47, 68, 69, Gd. It also opens at contact 46 the circuit through sequence switch contacts 37 and 45 to the testing relay 38. This latter relay, however, is not released until its locking circuit through the interrupter bar 41 and brush 42 is broken by the movement of the brush 42 on to the insulating section 63, thus insuring that the brushes have advanced to a central position on the fixed terminals. The reaction of the test relay 38 which now occurs, opens the circuit for the power magnet 49, stopping the cord finder movement and closes a circuit Gd, 71, 72, 30, By, which causes the sequence switch 30 to move out of its hunting position 2 into a position 6, where it awaits the operation of the register. On entering position 3 there is closed at contact 40 a circuit Gd, 40, 54, 59, 50, 80, By, which by the energization of a relay 80, closes a circuit Gd, 70, 27, By, which sends the cord circuit sequence switch 27 out of position 2 to position 11. The operator having ascertained from the calling subscriber the number of the line wanted, now proceeds to write this number down on her number keyboard, and finally depresses the start key 17. There is shown in the drawing but one number key, the No. 8 "units" key 16, together with the start key 17. This units key has a contact 73 connected with the No. 8 contact point 74 of each units register of the secondary controller equipments. It will be understood, however, that other keys, such as "tens", "hundreds" and "thousands" keys, like the units key 16, have similar contacts connected to corresponding points of "tens," "hundreds" and "thousands" registers, one set for each secondary controller equipment, and each register like the units register 10. By pressing any one of or a combination of these keys, there is placed a ground connection or combination of ground connections on one or more of the contacts 0—9, of the registers. The operation with respect to all of the register elements and a complete number keyboard is similar to the operation now to be described with respect to the single units key 16 shown in Fig. 3, and the single register element 10.

The depression of the start-key 17 effects the operation of the register by closing a circuit for the register motor magnet 75 as follows: Gd, 76, 77, 75, 78, By. The register element 10 is of the same construction as a sequence switch, and the closing of this circuit causes it to rotate, progressively closing its contact points 0, 1, 2, etc., the start being made at any point wherein the register may happen to have been left after a previous operation. On reaching and closing the No. 8 contact point 74, there is completed a circuit for the test relay 79 as follows: Gd, 73, 74, 79, 81, 82, 84, 85, By. This circuit includes a relay 82 of the allotter 15, as well as the test relay 79 of the register element 10. Both of these relays act, the former closing at contact 86 a locking circuit for itself so that the circuit just traced now becomes Gd, 73, 74, 79, 81, 82, 83, 86, By. The test relay 79 opens at contact 77 the circuit of the register motor magnet 75, stopping the register element 10 on its contact point 8, and closes at contact 87 a circuit Gd, 76, 87, 88, 89, 90, By. Contact 88 and other similar ones in series with contact 87 are provided to be closed in the same manner as contact 87 by test relays similar to test relay 79 of other register elements (tens, hundreds and thousands, etc.) The circuit last traced includes the motor magnet of the cord finder sequence switch 30, which now moves out of position 6 into 7, wherein a circuit is closed for retracting the locking devices of the keyboard as follows: Gd, 19, 90, By. This restores the plungers of the depressed keys (16 and 17) so that the keyboard is now available for recording another call. The circuit through relays 79 and 82 is opened at the contacts, as contact 73 of the number keys and the allotter relay 82 in reacting closes at contact 91 a circuit Gd, 91, 92, 30, By, which sends the cord finder sequence switch out of position 7 and permits it to move on to position 15. On entering position 8 the cord finder sequence switch closes a circuit for allotter sequence switch magnet 93 as follows: By, 93, 94, 95, Gd. This sends the allotter out of position 1 into position 2.

The system of circuits is so organized that when the allotter enters position 2 (or 7 or 13) it will remain in that position unless at the moment or until there is another secondary controller available, that is to say, unless the cord finder sequence switch of some one of the secondary controllers is waiting in or reaches its awaiting allotment position 18. Let it be assumed for the moment that none of the secondary controllers is at the moment available. The allotter in that event stops in position 2 because there is no contact such as contact 103 of the cord finder sequence switch closed. A circuit, however, is closed for the relay 82 as follows: By, 96, 82, 97, 98, Gd, which circuit includes a current-limiting resistance 97. As will appear later, this resistance permits, in case there is an idle secondary controller (contrary to the present assumption) the short-circuiting of the relay 82 in the circuit just traced. Under the present assumption, however, the relay 82 is energized, and its contact 86 is again closed. The allotter being in position 2 (or 7 or 13), there is now closed a new path for the lock-retracting magnets 19 of the keyboard as follows: By, 86, 99, 19, Gd. As long as this circuit is maintained, the locking devices for the keyboard are maintained retracted, so that the operator, on attempting to write down a call, ascertains at once, by the immediate reaction of the key plungers, that there is no secondary controller available. The operator then waits a moment and tries again to write down the call. As soon as there is a secondary controller available the locking devices are restored and the operator is aware of that fact by the locking down of the keys when she depresses them.

The means for restoring the locking devices is as follows: When any one of the secondary controllers becomes available, the cord finder sequence switch thereof will have reached its "awaiting allotment" position 18, (the progress of this sequence switch from position 15 to 18 to be described later), wherein a contact, such as contact 101 of the cord finder sequence switch 30, connects battery directly in circuit with the resistance 97, thus shunting out the relay 82, this circuit being By, 101, 102, 97, 98, Gd. Relay 82 thereupon reacts and opens at contact 86 the circuit of the lock-retracting magnets 19. There is also closed in position 18 of any of the cord finder sequence switches at its contact 103 a circuit Gd, 103, 104, 93, By, which sends the allotter out of position 2 and on to position 6, wherein it allots for the next call the next secondary controller in order, provided that one is available.

In case the next secondary controller is not available, the allotter will move out of position 6 by the closure of a circuit, which is just like the circuit previously traced, through contacts 95 and 94, but which in this case extends through the allotter contact 105, a conductor 106 and a contact of the secondary controller 12, corresponding to contact 94 of the cord finder sequence switch 30. Upon entering position 7, the allotter now moves on by reason of the closure of a circuit similar to the one previously traced through contacts 103 and 104, and when the allotter reaches position 12, as in the case now considered, it allots for service the third secondary controller 13. In this manner the allotter is caused to move on, allotting ordinarily each secondary controller in order, but moving by any one that is busy in case there is still another one available. And in case all are busy, it stops at one of the intermediate positions 2, 7 or 13, wherein it causes the lock-retracting magnets 19 of the keyboard to be energized.

The operation of the cord finder sequence switch 30 has been described up to its advance to position 15. In this position the sender 9 operates under the control of the register (and any other register elements of the same sender) to set up the connection between stations 1 and 2. It may be assumed that the circuit is thus completed in any desired manner and by any suitable mechanism and sender system between these two stations, say at contacts 5, 6 and 7, 8 of automatic switches. The sender 9 having then performed its function, there will be closed, in any suitable manner, preferably automatically, a contact 107 associated with the sender which completes a circuit Gd, 107, 53, 58, 108, 27, By, which sends the cord circuit sequence switch 27 out of position 11 into talking position 16, and in this movement the connections of the sender to the talking circuit are broken at contacts 109, 111 and the talking circuit completed at contacts 112 and 113. On leaving position 11, the locking circuit for the holding relay 47 is broken at contact 67 of the cord circuit sequence switch so that this holding relay reacts, closing at its contact 46 a circuit Gd, 46, 114, 30, By, which sends the cord finder sequence switch out of position 15 into the switch-restoring position 17 in which is closed a circuit Gd, 46, 45, 115, 116, By, which includes a restoring magnet 116 for the cord finder. On reaching its normal position, the cord finder brush 61 engages the normal contact 62, thereby closing a circuit Gd, 61, 62, 117, 30, By, which sends the cord finder sequence switch out of position 17 into position 18, where it awaits allotment by the allotter 15. The allotment of the secondary controller with which cord finder 11, sender 9 and register element 10 are associated, occurs upon the closing through contact 118 of a circuit which is completed when the allotter reaches position 1 as follows: Gd, 95, 118, 30, By. The cord finder sequence switch being allotted in this way, advances to its normal position 1, where the operation is repeated and proceeds in the manner already fully described whenever any of the operators' cords is taken for use.

The cord circuit sequence switch 27 has a master contact 119, which determines its resting positions, previously noted, as follows: 1—normal, 2—awaiting sender, 11—selection, 16—talking. The cord finder sequence switch 30 has a master contact 121 which determines its rest positions; 1—normal, 2—hunting, 6—awaiting register, 7—key release, 15—waiting disconnection from cord, 17—cord finder restoration, 18—waiting allotment.

The register 10, which is also of the nature of a sequence switch, has a master contact 122, which determines its resting positions 0-9 inclusive, and the allotter 15, which is also in construction like a sequence switch, has a master contact 123 which determines its resting positions; 1—allotting secondary controller A; 2—waiting an idle controller; 6—allotting controller B; 7—waiting an idle controller; 12—allotting controller C; 13—awaiting an idle controller.

What is claimed is:

1. In a switch controller system, the combination with an adjustable primary controller and a plurality of secondary controllers each adapted to be automatically adjusted by means of said primary controller, of means for rendering said primary controller unadjustable during periods of simultaneous use of said secondary controllers.

2. In a switch controller system, the combination with an adjustable primary controller and a plurality of secondary controllers adjustable by means of said primary controller, of means for allotting said secondary controllers one at a time to said primary controller, and means controlled in common by said secondary controllers to render said primary controller unadjustable.

3. In a switch controller system, the combination with a primary controller and a plurality of secondary controllers adjustable by means of said primary controller, of mechanism adapted in a plurality of positions to successively allot said secondary controllers to said primary controller, and means for arresting said mechanism in an intermediate position during periods of simultaneous use of said secondary controllers.

4. In a switch controller system, the combination with an adjustable primary controller and a plurality of secondary controllers adjustable by means of said primary controller, of mechanism adapted in a plurality of positions to successively allot said secondary controllers to said primary controller, and means adapted in an intermediate position of said mechanism to render said primary controller unadjustable.

5. In a switch controller system, the combination with an adjustable primary controller and a plurality of secondary controllers each adjustable by means of said primary controller when allotted thereto, of an allotter having a plurality of allotting and a plurality of intermediate positions, means for arresting said allotter in an intermediate position operable during periods of simultaneous use of said secondary controller, and means for rendering said primary controller unadjustable when said allotter is resting in said intermediate position.

6. In a switch controller system, the combination with an adjustable primary controller, locking means therefor, and a plurality of secondary controllers each having a register mechanism adapted for adjustment by said primary controller, of means for successively allotting said register mechanisms to said primary controller, and means for rendering said locking means ineffective during periods of simultaneous use of said secondary controllers.

7. In a switch controller system, the combination with an adjustable primary controller, locking means therefor, lock-retracting means, and a plurality of secondary controllers each of which operating under the control of said primary controller is adapted to register an adjusted condition thereof and when adjusted to cause the actuation of said lock-retracting means, of means controlled by said secondary controllers operative when any of them is in idle condition to cause the restoration of said locking means.

8. In a controller system, the combination with an electrical keyboard and point finder mechanism thereby adjustable, of locking means for said keyboard effective during periods of adjustment of said mechanism, and means for rendering said locking means ineffective upon adjustment of and during periods of use of said mechanism.

9. In a controller system, the combination with a keyboard, a plurality of switch controllers each adjustable by means of said keyboard, of means for successively allotting said controllers to said keyboard, and means to render said keyboard unadjustable during periods of simultaneous use of said controllers.

In witness whereof, we hereunto subscribe our names this 10th day of December A. D., 1914.

FRANK N. REEVES.
ALBEN E. LUNDELL.

Witnesses:
E. EDLER,
K. L. STAHL.

Copies of this patent may be obtained for five cents each, by addressing the "Commissioner of Patents, Washington, D. C."